United States Patent
Wang et al.

(10) Patent No.: US 11,609,375 B2
(45) Date of Patent: Mar. 21, 2023

(54) PHOTONIC INTEGRATED CIRCUIT SYSTEM AND METHOD OF FABRICATION

(71) Applicant: Luminous Computing, Inc., Menlo Park, CA (US)

(72) Inventors: Lei Wang, Menlo Park, CA (US); Thomas W. Baehr-Jones, Menlo Park, CA (US); Mitchell A. Nahmias, Menlo Park, CA (US)

(73) Assignee: Luminous Computing, Inc., Santa Clara, CA (US)

( * ) Notice: Subject to any disclaimer, the term of this patent is extended or adjusted under 35 U.S.C. 154(b) by 0 days.

(21) Appl. No.: 17/671,049

(22) Filed: Feb. 14, 2022

(65) Prior Publication Data

US 2022/0269002 A1     Aug. 25, 2022

Related U.S. Application Data

(60) Provisional application No. 63/281,567, filed on Nov. 19, 2021, provisional application No. 63/152,275, filed on Feb. 22, 2021.

(51) Int. Cl.
*G02B 6/12*     (2006.01)
*G02B 6/132*     (2006.01)
(Continued)

(52) U.S. Cl.
CPC ......... *G02B 6/12019* (2013.01); *G02B 6/132* (2013.01); *G02B 6/136* (2013.01); *G02B 2006/12061* (2013.01)

(58) Field of Classification Search
CPC .............. G02B 6/12; G02B 6/38; G02B 6/00
(Continued)

(56) References Cited

U.S. PATENT DOCUMENTS

| | | | | |
|---|---|---|---|---|
| 6,363,183 B1 * | 3/2002 | Koh | ..................... | G02B 6/3584 385/16 |
| 6,690,845 B1 * | 2/2004 | Yoshimura | ............. | G02B 6/124 257/E25.032 |

(Continued)

FOREIGN PATENT DOCUMENTS

WO    WO-2022029939 A1 *   2/2022

OTHER PUBLICATIONS

"NVSwitch—Nvidia", Wikichip, Chips & Semi, https://en.wikichip.org/wiki/nvidia/nvswitch, Mar. 27, 2018.

(Continued)

*Primary Examiner* — Kaveh C Kianni
(74) *Attorney, Agent, or Firm* — Stratford Group Ltd.

(57) ABSTRACT

A photonic integrated circuit (PIC) system, preferably including a substrate, one or more photonic connections, and a plurality of circuit blocks. The circuit blocks preferably include one or more waveguides that are optically coupled to the photonic connections, such as by transition features. A method of PIC fabrication, preferably including defining a PIC structure and defining circuit blocks. The circuit blocks are preferably defined onto one or more template regions defined by the PIC structure. Photonic connections are preferably defined as part of the PIC structure. Transition features, such as transitions between the photonic connections and the circuit blocks, are preferably defined concurrently with defining the circuit blocks.

18 Claims, 9 Drawing Sheets

(51) Int. Cl.
*G02B 6/136* (2006.01)
*G02B 6/38* (2006.01)

(58) Field of Classification Search
USPC .......................................................... 385/14
See application file for complete search history.

(56) References Cited

U.S. PATENT DOCUMENTS

| | | | |
|---|---|---|---|
| 8,372,726 B2* | 2/2013 | de Graff | H01L 27/14618 |
| | | | 438/457 |
| 8,536,667 B2* | 9/2013 | de Graff | A61B 8/12 |
| | | | 257/419 |
| 10,209,452 B1 | 2/2019 | Hung et al. | |
| 11,079,548 B2* | 8/2021 | Chang | G02B 6/32 |
| 11,105,989 B2* | 8/2021 | Lim | G02B 6/4231 |
| 2002/0028045 A1* | 3/2002 | Yoshimura | H01L 23/5389 |
| | | | 385/39 |
| 2002/0039464 A1* | 4/2002 | Yoshimura | H01L 24/24 |
| | | | 257/E25.032 |
| 2002/0097962 A1* | 7/2002 | Yoshimura | G02B 6/124 |
| | | | 385/16 |
| 2004/0126053 A1 | 7/2004 | Ouchi | |
| 2007/0075443 A1* | 4/2007 | Cunningham | H01L 24/13 |
| | | | 257/797 |
| 2007/0075444 A1* | 4/2007 | Zheng | H01L 24/72 |
| | | | 257/797 |
| 2013/0209026 A1* | 8/2013 | Doany | G02B 6/32 |
| | | | 438/32 |
| 2013/0230274 A1* | 9/2013 | Fish | G02B 6/305 |
| | | | 385/14 |
| 2014/0044391 A1* | 2/2014 | Iizuka | H01L 31/173 |
| | | | 438/24 |
| 2014/0334768 A1* | 11/2014 | Chang | G02B 6/4204 |
| | | | 438/27 |
| 2015/0211960 A1* | 7/2015 | Shimizu | G02B 6/02057 |
| | | | 356/73.1 |
| 2015/0333831 A1 | 11/2015 | Lai et al. | |
| 2016/0062063 A1* | 3/2016 | Ogura | G02B 6/428 |
| | | | 264/1.27 |
| 2016/0109655 A1* | 4/2016 | Vurgaftman | G02B 6/12004 |
| | | | 385/14 |
| 2016/0359568 A1* | 12/2016 | De Dobbelaere | G02B 6/34 |
| 2016/0366498 A1 | 12/2016 | Robinson et al. | |
| 2017/0163000 A1 | 6/2017 | Evans et al. | |
| 2017/0366884 A1 | 12/2017 | Rickman et al. | |
| 2018/0106967 A1 | 4/2018 | Santori et al. | |
| 2018/0234177 A1 | 8/2018 | Li | |
| 2018/0246279 A1* | 8/2018 | Florian Lohse | G02B 6/13 |
| 2018/0335365 A1* | 11/2018 | Kamei | G01M 11/30 |
| 2019/0025505 A1* | 1/2019 | Kraft | G02B 6/428 |
| 2019/0170945 A1* | 6/2019 | Fortusini | G02B 6/305 |
| 2019/0219782 A1 | 7/2019 | Liow et al. | |
| 2019/0331941 A1* | 10/2019 | Coolbaugh | G02F 1/035 |
| 2020/0013699 A1 | 1/2020 | Liu et al. | |
| 2020/0091124 A1* | 3/2020 | Liao | G02B 6/4201 |
| 2020/0200987 A1* | 6/2020 | Kim | G02B 6/43 |
| 2021/0124107 A1* | 4/2021 | Meade | G02B 6/305 |
| 2021/0203126 A1* | 7/2021 | Parker | G02F 1/025 |
| 2021/0373236 A1* | 12/2021 | Jiang | G02B 6/43 |

OTHER PUBLICATIONS

Dai, Daoxin, et al., "Mode conversion in tapered submicron silicon ridge optical waveguides", Optics Express, vol. 20, No. 12, Jun. 4, 2012.

Petrini, Fabrizio, et al., "Communication Performance of Wormhole Interconnection Networks", https://www.researchgate.net/publication/2574082_Communication_Performance_of_Wormhole_Interconnection_Networks, Apr. 2001.

Shacham, Assaf, et al., "Maximizing GFLOPS-per-Watt: High-Bandwidth, Low Power Photonic On-Chip Networks", http://www.cs.columbia.edu/~luca/research/pnocs_PAC07.pdf, 2006.

Song, Weiwei, et al., "High-density waveguide superlattices with low crosstalk", Nature Communications, May 11, 2015.

Zhao, Huasha, et al., "Sparse Allreduce: Efficient Scalable Communication for Power-Law Data", arXiv:1312.3020v1 [cs.DC] Dec. 11, 2013.

* cited by examiner

PHOTONIC INTEGRATED CIRCUIT SYSTEM AND METHOD OF FABRICATION

CROSS-REFERENCE TO RELATED APPLICATIONS

This application claims the benefit of U.S. Provisional Application Ser. No. 63/152,275, filed on 22 Feb. 2021, and of U.S. Provisional Application Ser. No. 63/281,567, filed on 19 Nov. 2021, each of which is incorporated in its entirety by this reference.

TECHNICAL FIELD

This invention relates generally to the photonic integrated circuit (PIC) field, and more specifically to a new and useful PIC system and method of fabrication.

BACKGROUND

Typical contact mask photolithography approaches can pattern an entire wafer in a single exposure, but may not be able to achieve sufficiently high resolution to enable fabrication of small features that are necessary and/or beneficial for many modern integrated circuit (IC) and/or photonic integrated circuit (PIC) designs. In contrast, typical stepper mask photolithography can achieve very high resolution patterning, but typically cannot pattern a region as large as an entire wafer in a single exposure; rather, stepper mask photolithography operates by exposing different regions of a substrate in steps, typically using the same mask to expose each such region. Neither of these photolithography techniques is capable of patterning on an entire-wafer scale with sufficiently high resolution to enable many modern PIC designs.

Thus, there is a need in the PIC field to create a new and useful PIC system and method of fabrication.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

A photonic integrated circuit (PIC) system 100 preferably includes a substrate 101, one or more photonic connections 110, and a plurality of circuit blocks 120 (e.g., as shown in FIGS. 1A-1D). The PIC system 100 can additionally or alternatively include any other suitable elements.

Figure 2A:
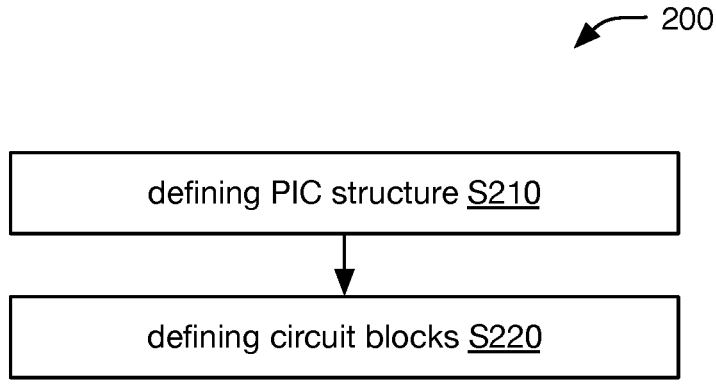
FIG. 2A is a schematic representation of an embodiment of a method of fabrication for a photonic integrated circuit system.
Figure 2B:
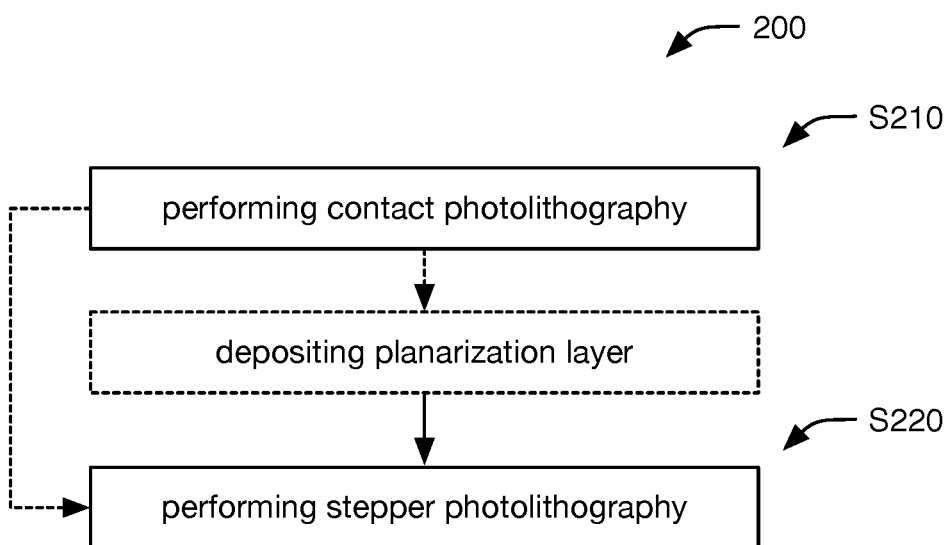
FIG. 2B is a schematic representation of an example of the method.

A method of PIC fabrication 200 preferably includes defining a PIC structure S210 and defining circuit blocks S220 (e.g., as shown in FIGS. 2A-2B). However, the method 200 can additionally or alternatively include any other suitable elements.

The PIC system is preferably fabricated as described below regarding the method 200, but can additionally or alternatively be fabricated in any other suitable manner.

2. PIC System.

2.1 Substrate.

The substrate 101 preferably functions to support (and/or provide material for defining) other elements of the system (e.g., electronic and/or photonic elements, such as those of the circuit blocks 120 and/or photonic connections 110). For example, these other elements can be etched into and/or deposited onto the substrate.

The substrate is preferably substantially wafer-scale in size (e.g., having a length scale in one or more dimensions, such as a diameter, height, and/or width, of several inches), but can alternatively be any other suitable size. In examples, the substrate can be substantially circular (e.g., circular except for one or more wafer flats), with a diameter of 25 mm, 51 mm, 76 mm, 100 mm, 125 mm, 150 mm, 200 mm, 300 mm, 450 mm, 675 mm, or any other suitable diameter (e.g., within any suitable open or closed interval bounded by one or more of the aforementioned diameter values, less than 25 mm, greater than 675 mm, etc.); alternatively, the wafer can have a non-circular shape, and can define one or more length scales (e.g., height, width, etc.) equal to the aforementioned diameter values.

In some embodiments, the substrate can be a silicon on insulator (SOI) substrate, a silicon substrate, and/or any other suitable substrate for photonic device fabrication.

However, the system can additionally or alternatively include any other suitable substrate having any suitable characteristics.

2.2 Photonic Connections.

The photonic connections 110 preferably include one or more connecting waveguides in, which can function to provide optical connection paths between the circuit blocks 120. The connecting waveguides can optionally provide optical connection paths between the circuit blocks and other elements, such as: switch elements (e.g., operable to configure communicative connections between other elements of the system; in some examples, these may be defined within one or more of the circuit block regions, and/or defined in any other suitable regions); edge devices (e.g., fiber transposers 190 configured to optically couple the connecting waveguides to optical fibers; free-space couplers, such as gratings, configured to couple light from the connecting waveguides into and/or out of free-space modes; etc.), preferably arranged at and/or near the edge of the substrate; optical fibers 90 (e.g., as shown in FIG. 1D); and/or photonic elements defined on other substrates.

The connecting waveguides 111 are preferably multi-mode waveguides, which can enable low-loss transmission of light through the waveguides. In one example, in which the waveguides are fabricated in a silicon photonics platform (e.g., on an SOI substrate) and are configured to carry O- and/or C-band optical signals, the connecting waveguides can have a width greater than 1 μm (e.g., 2-10 μm). However, some or all of the connecting waveguides can alternatively be single-mode waveguides (e.g., in the example above, narrower than 1 μm) and/or can have any other suitable characteristics.

Figure 1A:
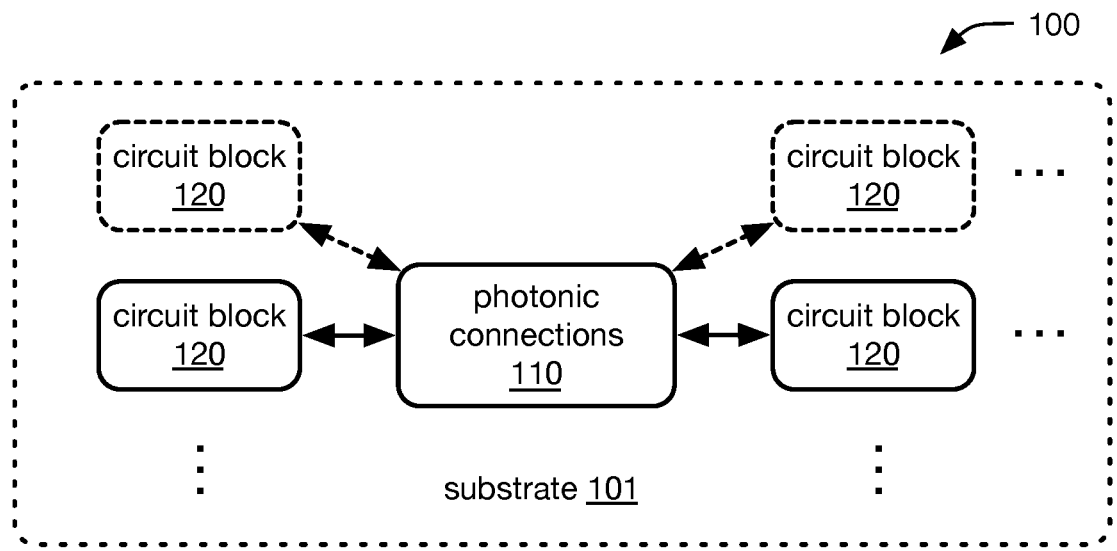
FIG. 1A is a schematic representation of an embodiment of a photonic integrated circuit system.
Figure 1B:
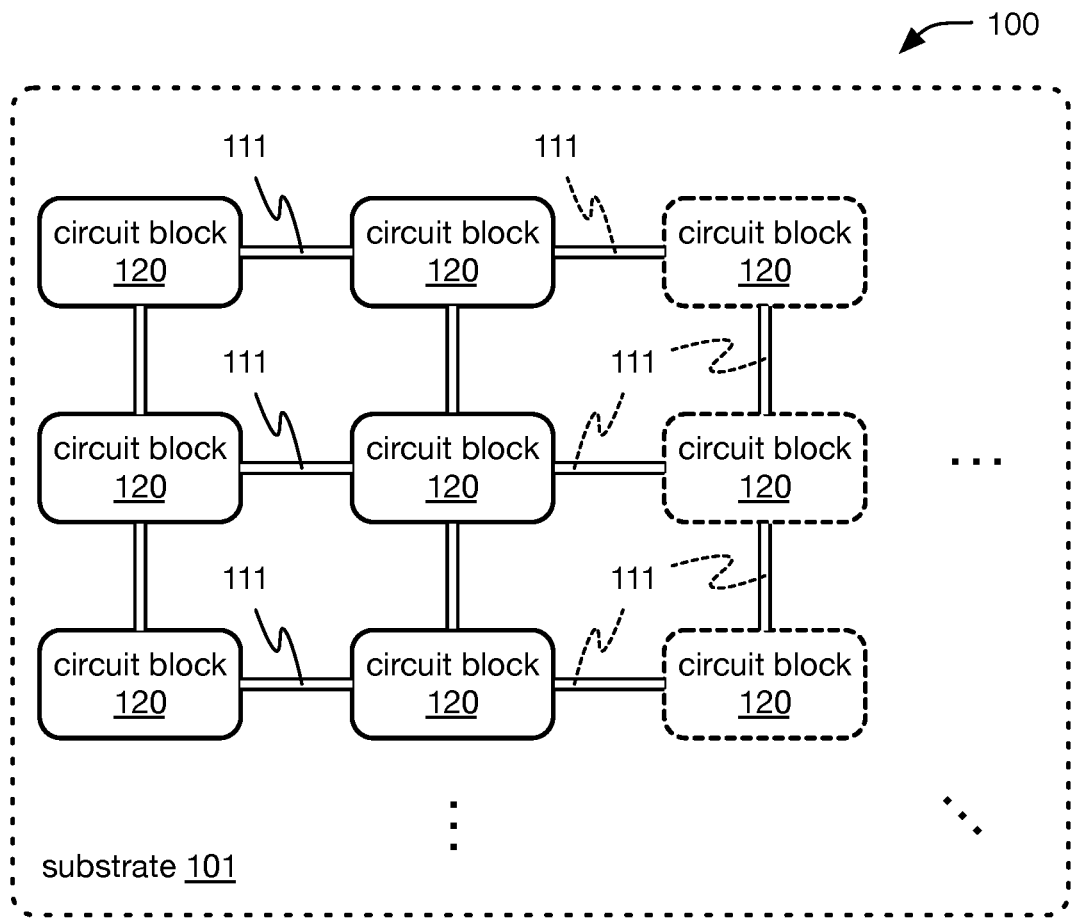
FIGS. 1B-1D are schematic representations of a first, second, and third variation, respectively, of the embodiment of the photonic integrated circuit system.
Figure 1C:
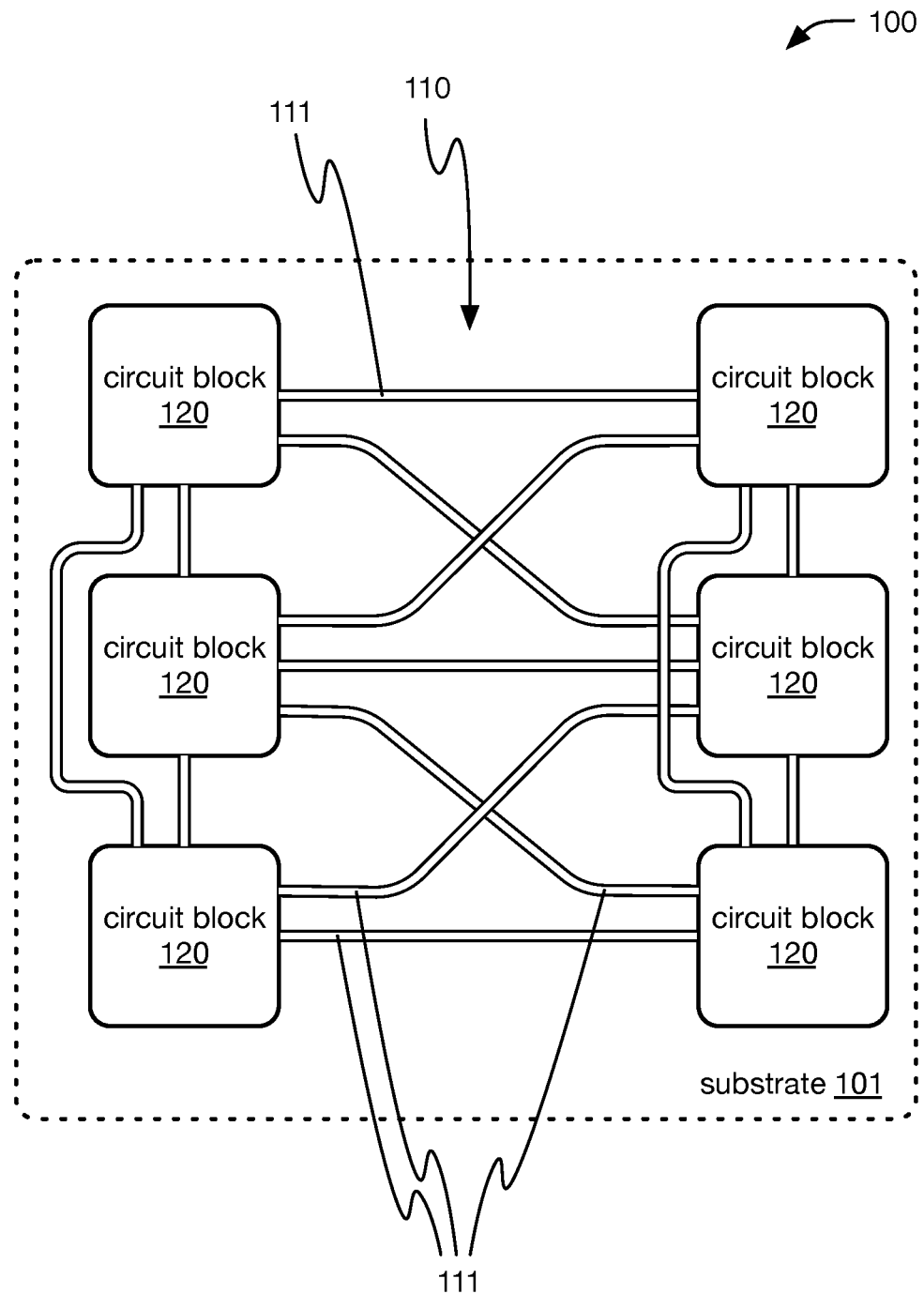
Figure 1D:
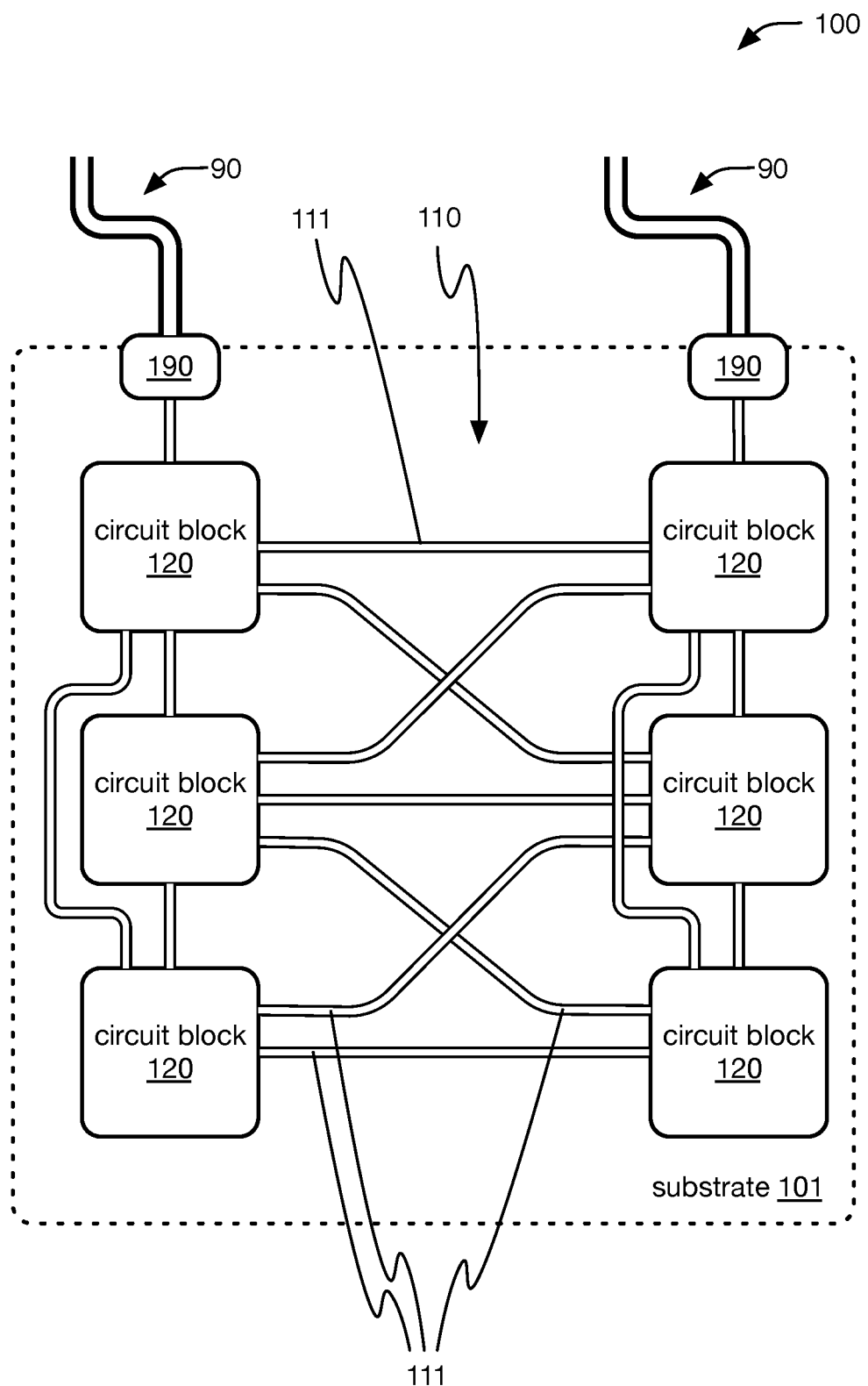

One or both ends of each connecting waveguide 111 preferably connects to a circuit block 120 (e.g., each end connecting to a different circuit block of the system, such as shown by way of examples in FIG. 1B-1C). The connecting waveguide preferably connects to the circuit block at a transition waveguide 121 (e.g., at the transition feature 121a thereof, such as shown by way of examples in FIGS. 3 and 4A-4C), but can alternatively connect to the circuit block in any other suitable manner. The photonic connections can define any suitable connectivity between the circuit blocks, such as, in examples, nearest-neighbor mesh connections (e.g., as shown in FIG. 1B), nearest- and second-nearest-neighbor mesh connections (e.g., as shown in FIG. 1C), all-to-all connections, row and column mesh connections (e.g., wherein the circuit blocks are arranged in a rectangular array defining rows and columns of circuit blocks, and each circuit block is directly connected to every other circuit block in its row and in its column), toroidal mesh connections (e.g., standard toroidal mesh, folded toroidal mesh, etc.), hypercube mesh connections (optionally including some crossing connections), and the like. In some examples, the photonic connections can include one or more connecting waveguides that connect between different portions (e.g., different transition waveguides and/or ends thereof) of the same circuit block. In some examples, the system can include one or more switching elements (e.g., electronic and/or photonic switch modules) operable to configure communicative connections between the other elements of the system (e.g., between the different circuit blocks, waveguides, etc.). However, the photonic connections can additionally or alternatively define any other suitable communication topologies.

As seen by way of example in FIG. 1C, the circuit blocks preferably define specific optical coupling locations (e.g., along one or more of their edges), which are preferably fixed between the different circuit blocks; further, each optical coupling location preferably corresponds to the same functionality in each circuit block (e.g., input location, output location, etc.). Each optical coupling location preferably corresponds to a transition waveguide (e.g., wherein the transition feature of the waveguide is located at or proximal to the coupling location). Although the same optical coupling locations are preferably available in all circuit blocks, in some embodiments, the PIC structure may not include connecting waveguides connected to each of these optical coupling locations, but rather only to a subset thereof (e.g., as shown in FIG. 1C).

The photonic connections no can optionally include one or more active and/or passive photonic devices, and/or can include any other suitable elements.

2.3 Circuit Blocks.

The circuit blocks 120 (e.g., photonic circuit blocks) preferably function to provide photonic and/or electronic functionality for the system.

For example, each circuit block (or alternatively, each of a subset of the circuit blocks) can include one or more electrical/optical transducers (or portions thereof), which can function to convert between electrical signals and optical signals (either in a unidirectional or bidirectional manner). In a first specific example, each circuit block 120 includes one bidirectional electrical/optical transducer (e.g., configured to convert electrical signal inputs to optical signal outputs and to convert optical signal inputs to electrical signal outputs). In a second specific example, each circuit block 120 includes one (unidirectional) electrical-to-optical transducer (e.g., configured to convert electrical signal inputs to optical signal outputs) and one (unidirectional) optical-to-electrical transducer (e.g., configured to convert optical signal inputs to electrical signal outputs).

Additionally or alternatively, each circuit block (or alternatively, each of a subset of the circuit blocks) can include one or more photonic computing elements (e.g., analog multiplier elements, analog accumulator elements, multiply-accumulate networks, etc.), photonic networking elements (e.g., optical switches), and/or any other suitable photonic elements (or portions thereof).

The circuit blocks 120 are preferably repeated across the substrate. More preferably, the circuit blocks define (or substantially define) a regular array, such as a rectangular array. In one example, the repeated circuit blocks are patterned via photolithography by a stepper (e.g., operating in a stepping or scanning/stepping mode). Each circuit block is preferably a relatively small-scale feature (as compared with the overall substrate size), such as being approximately inch-scale or smaller (e.g., contained within a stepper exposure field, such as a 26×33 mm or 16.5×26 mm exposure field). However, the circuit blocks can alternatively be any other suitable size.

In some embodiments, one or more of the repeated circuit blocks may omit one or more elements of the repeated circuit block design (e.g., the same elements and/or different elements as omitted from other blocks), preferably wherein these elements are replaced by a uniform region (e.g., a completely etched or unetched region).

Figure 3:
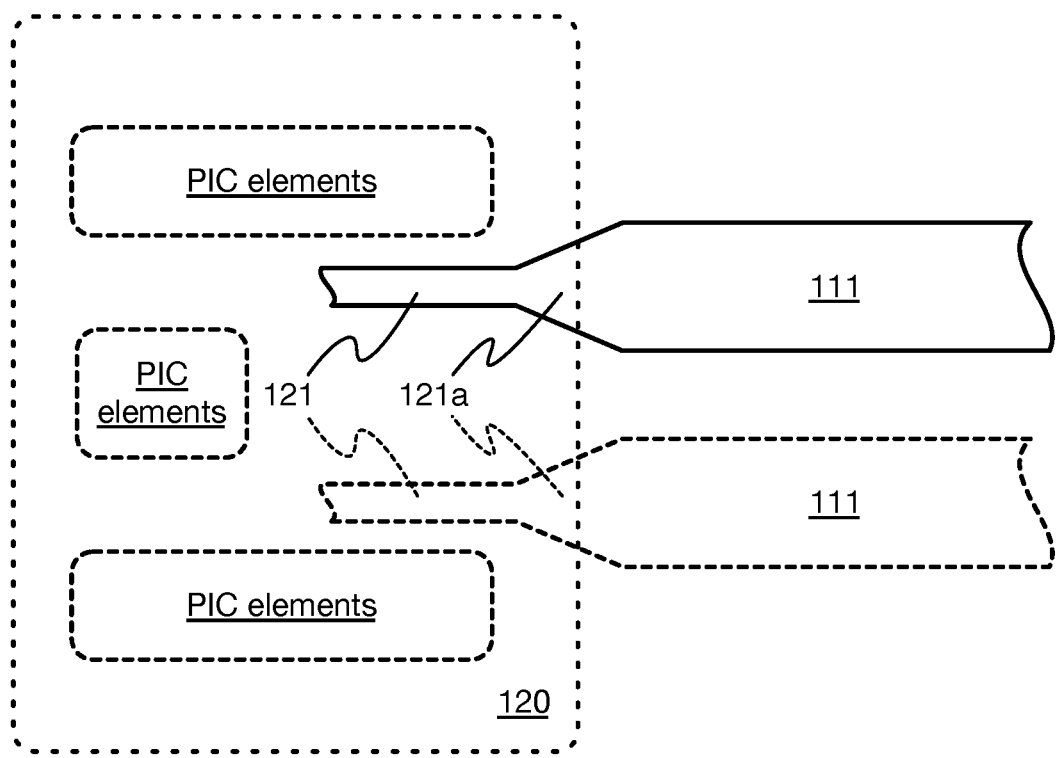
FIG. 3 is a schematic representation of an example of a circuit block of the photonic integrated circuit system.

Each circuit block preferably includes one or more transition waveguides 121 (e.g., as shown in FIG. 3). The transition waveguide preferably functions to optically couple elements within the circuit block (e.g., photonic devices) to a connecting waveguide 111. The transition waveguide is preferably a single-mode waveguide, which can facilitate transduction, modulation, and/or other manipulation of the optical signals carried by the waveguide. For example, in a silicon photonic platform (e.g., fabricated on an SOI wafer) in which optical signals are propagated using O- and/or C-band light, the transition waveguides are preferably less than 1 μm wide. However, some or all of the transition waveguides can alternatively be multi-mode waveguides, and/or can have any other suitable characteristics.

Each transition waveguide 121 preferably includes one or more transition features 121a (e.g., one transition feature for each connecting waveguide to which the transition waveguide is optically coupled). The transition feature 121a can function to efficiently couple light between the transition waveguide 121 and the connecting waveguide 111 to which it is optically coupled (e.g., couple light from the transition waveguide to the connecting waveguide and/or from the connecting waveguide to the transition waveguide). In some embodiments, the transition feature can function to convert between single-mode and multi-mode light propagation (e.g., moving from multi-mode propagation within the connecting waveguide to single-mode propagation within the transition waveguide, or transitioning from single-mode propagation within the transition waveguide to multi-mode propagation within the connecting waveguide).

Figure 4A:
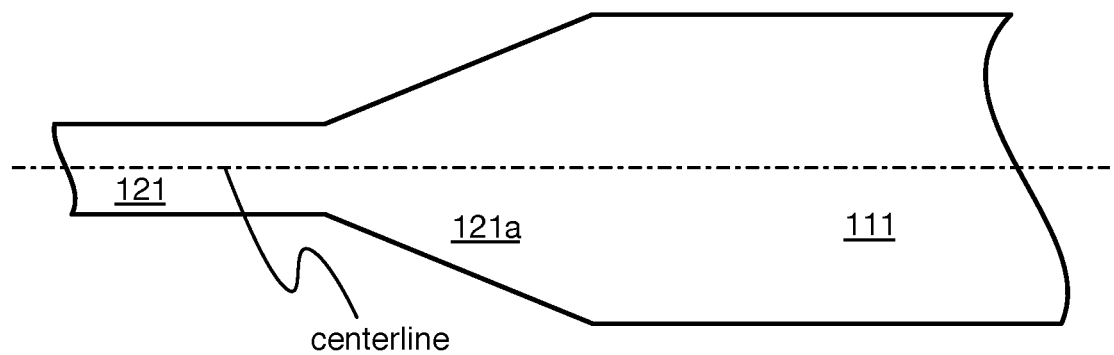
FIG. 4A is a schematic representation of an example of a transition feature between well-aligned waveguides.
Figure 4B:
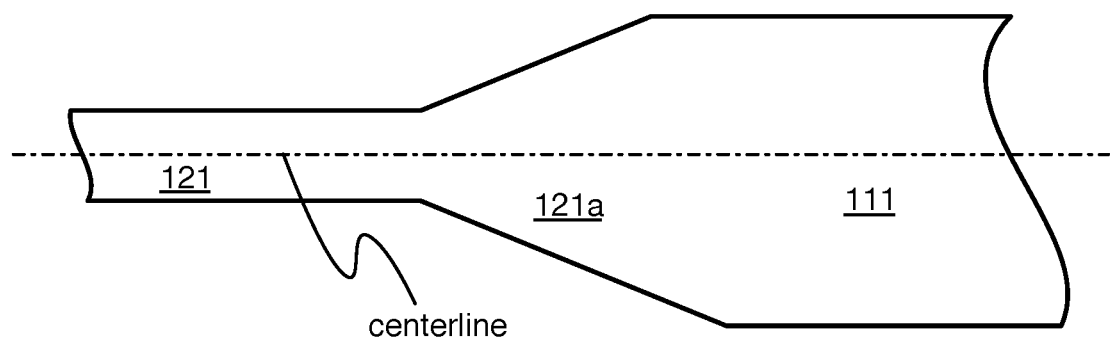
FIGS. 4B-4C are schematic representations of a first and second example, respectively, of a transition feature between misaligned waveguides.
Figure 4C:
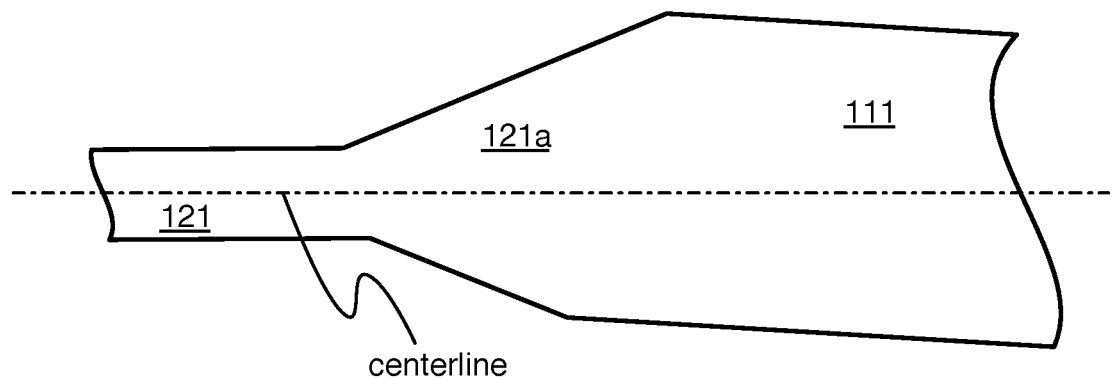

The transition feature preferably defines a tapered region between the transition waveguide and the connecting waveguide (e.g., tapering from the connecting waveguide width down to the transition waveguide width), such as shown by way of examples in FIGS. 4A-4C. The taper can be linear, curved (e.g., defining a power function, such as a quadratic), and/or have any other suitable profile. In some examples, the transition feature can define an adiabatic taper. In some examples, the transition feature can include one or more elements such as described in Dai et al. (2012), "Mode conversion in tapered submicron silicon ridge optical waveguides", Optics express, 20(12), 13425-13439, which is herein incorporated in its entirety by this reference.

The transition feature preferably includes no (or minimal) 'sharp' features, such as discontinuities, high-angle edges, abrupt changes in effective index of refraction, and the like, as such features may cause reflections, absorption, light emission, and/or otherwise reduce coupling efficiency between the waveguides.

However, the transition feature can additionally or alternatively have any other suitable characteristics.

The transition feature 121a is preferably arranged proximal the connecting waveguide 111 (e.g., at or near an end of the connecting waveguide). The transition feature 121a is preferably arranged at (or near) an end of the transition waveguide 121. The transition feature is preferably substantially aligned with (e.g., centered on) the connecting waveguide, as shown by way of examples in FIGS. 3 and 4A. In some embodiments, errors, such as registration tolerances (e.g., between different patterning processes, such as patterning processes responsible for defining the connecting waveguide 111 and the transition waveguide 121), can result in some misalignment, such as shown by way of examples in FIGS. 4B-4C. Despite any such misalignment, the transition feature preferably preserves the desired characteristics (e.g., those described above, such as a taper between the two waveguides and a lack or minimization of 'sharp' features).

In an alternate variation, some or all transition waveguides can include a multi-mode portion (e.g., instead of and/or in addition to a single-mode portion). For example, the portion of a transition waveguide that optically couples to a connecting waveguide can be multi-mode. In a first such example, the entire transition waveguide can be a multi-mode waveguide. In a second such example, the transition waveguide can transition from the multi-mode portion to a single-mode portion, such as via one or more transition features (e.g., analogous to the transition features described above, but arranged within the transition waveguide at the transition between single-mode and multi-mode, rather than being arranged at the transition between the transition waveguide and the connecting waveguide).

However, the transition feature can additionally or alternatively have any other suitable arrangement within the system.

The circuit blocks 120 can optionally include one or more additional elements, which can function to implement the desired functionality of the circuit block (e.g., to implement the electrical/optical transducer(s)), and/or can have any other suitable function(s). These additional elements can optionally include one or more photonic and/or electronic devices (e.g., active and/or passive devices). These additional elements can optionally include one or more additional waveguides, preferably single-mode waveguides but additionally or alternatively multi-mode waveguides (e.g., waveguides optically coupled to photonic devices and/or transition waveguides of the circuit block). These additional elements can optionally include one or more electrical traces (e.g., electrically coupled to electronic and/or photonic devices, such as active photonic devices electrically coupling elements of the circuit block to elements outside the circuit block, etc.). However, the circuit blocks 120 can additionally or alternatively include any other suitable elements in any suitable arrangement.

The PIC system 100 can additionally or alternatively include other electronic and/or photonic elements (e.g., patterned into and/or onto the substrate) and/or any other suitable elements in any suitable arrangement.

2.4 Material Platforms.

The PIC system 100 can include (e.g., be made of) any suitable materials. The system (and/or elements thereof, such as some or all of the photonic elements) can be implemented on one or more material platforms, such as photonic integrated circuit platforms (e.g., silicon photonics platforms, monolithically integrated photonics and electronics platforms, other photonic platforms, etc.), microelectronic platforms, and/or any other suitable material platforms. In a first embodiment, the system is implemented as a monolithic platform (e.g., including both photonic elements and electronic elements on a single chip). In a second embodiment, the system is implemented as a heterogeneously integrated platform, such as a platform including two or more chips (e.g., with electronic and/or photonic interfaces between the chips). For example, the heterogeneously integrated platform can include a photonics chip including photonic elements (e.g., and relatively few or no electronic elements, relatively few or no electronic elements with fabrication dimensions below a threshold, etc.; alternatively, including significant electronic elements) and an electronics chip including electronic elements (e.g., and few or no photonic elements; alternatively, including significant photonic elements). In some examples (e.g., of the second embodiment), the system is fabricated via co-integration (e.g., between electronics and photonics), such as wherein different elements of the system can be joined together (e.g., for wafer-to-wafer, die-to-wafer, and/or die-to-die bonding) using one or more packaging technologies such as flip chip bonding, wafer bonding (e.g., direct bond interconnect, hybrid bonding, etc.), through-oxide vias (TOVs), through-silicon vias (TSVs), metal bonding (e.g., eutectic bonding), adhesive bonding, and/or any other suitable bonding interfaces.

In one embodiment, the system can include elements implemented in a silicon photonics platform (e.g., implemented by one or more foundries such as APSUNY, IME, IMEC, GlobalFoundries, TSMC, etc.), which can include silicon, silicon doping, silicon oxides, passive silicon components (e.g., waveguides, filters, etc.), and/or germanium-based elements (e.g., detectors, filters and/or modulators, such as EAMs, etc.). Additionally or alternatively, the system can include elements implemented in one or more III-V platforms (e.g., JePPiX consortium SMART Photonics and/or HHI platforms, Infinera, AIM Photonics, etc.), which can include materials such as indium compounds, phosphide compounds, gallium compounds, arsenide compounds, and/or any other suitable III-V semiconductors (e.g., InGaAsP alloys, such as InP or GaAs substrate with InGaAsP features). In an example of this embodiment, the emitters (e.g., laser array) are fabricated in the III-V semiconductor platform, the multiplexer is fabricated in either the III-V semiconductor platform or the silicon photonics platform, and substantially all other photonic elements of the system (e.g., except some or all waveguides associated with the emitters) are fabricated in the silicon photonics platform. In some examples, the elements can be co-integrated with elements implemented in an electronics platform (e.g., integrated such as described above regarding packaging technologies). In some such examples, one or more electronic elements (e.g., transistors) are fabricated in the photonics platform rather than the electronics platform (e.g., thereby enabling and/or facilitating use of high-voltage elements that exceed the voltage limits of the electronics platform). For example, in a system in which elements from a 7 nm electronics platform (e.g., with a 0.6-0.8V limit, such as a 0.65, 0.7, or 0.75 V limit) are coupled with elements from a silicon photonics platform, the silicon photonics platform elements can include transistors (e.g., configured to amplify signals received from the electronics platform elements) operating with voltages in excess of the electronics platform limit.

The system can additionally or alternatively include elements implemented in a monolithically integrated photonics and electronics platform (e.g., platform typically used for microelectronics) such as a monolithically integrated silicon photonics and electronics platform, preferably wherein some or all photonic and electronic elements of the system are implemented monolithically (e.g., collocated in the same integrated circuit). Additionally or alternatively, the systems can include elements implemented in a co-integrated electronic and photonic platform, such as one that includes front-end-of-line (FEOL) modifications to a standard microelectronic fabrication process and/or back-end-of-line (BEOL) modifications for the fabrication of integrated photonic components (e.g., with low capacitance links to the electronics).

The system can additionally or alternatively include elements implemented in a hybrid silicon/III-V photonics platform, such as wherein silicon photonics elements and III-V photonics elements (e.g., optical amplifiers, laser sources, etc.) are implemented monolithically (e.g., collocated in the same integrated circuit). For example, a III-V semiconductor substrate (e.g., InP) can support both the silicon photonics elements and III-V photonics elements.

The system can additionally or alternatively include elements implemented in a silicon nitride photonics platform (e.g., JePPiX consortium TriPLeX platform), such as including waveguides defined by silicon nitride within a silicon oxide.

The system can additionally or alternatively include elements implemented in a silicon-graphene photonics platform, such as wherein one or more photonic elements (e.g., active elements, such as detectors, filters, modulators, etc.) are implemented using graphene, other graphitic materials, and/or other 2-D materials.

The system can additionally or alternatively include elements implemented in a lithium niobate photonics platform, which can include one or more photonic elements implemented using lithium niobate, such as thin-film lithium niobate.

However, the PIC system can additionally or alternatively be implemented in any other suitable material platform, and can additionally or alternatively include any other suitable materials.

3. Method of Fabrication.
3.1 Defining a PIC Structure.

Defining a PIC structure S210 preferably functions to define arbitrary (e.g., not necessarily arrayed or repeating), large-scale (e.g., substantially wafer-scale, larger than the circuit blocks and/or a stepper exposure field in one or more dimensions, etc.), and/or lower-resolution (e.g., coarser than 1-2 μm resolution) features.

The PIC structure is preferably defined by etching a pattern into one or more layers of the substrate (and/or into one or more layers deposited and/or patterned onto the substrate). For example, the PIC structure can be defined by etching the silicon layer of an SOI wafer. However, the PIC structure can additionally or alternatively be defined by removing material from the substrate in any other suitable manner to define a pattern, by depositing material onto the substrate in a pattern, and/or by patterning material in any other suitable manner.

The patterning process can include one or more of: contact lithography (e.g., contact photolithography), nanoimprint lithography, direct write lithography (e.g., laser direct write lithography, electron beam lithography, etc.), and/or any other suitable patterning processes. The patterning process can optionally use a hardmask (e.g., one or more non-organic etch mask layers, to be patterned based on the organic resist patterning and then to act as a mask for subsequent patterning of the substrate material(s)).

The PIC structure preferably includes regions for circuit block definition. These circuit block regions are preferably unpatterned regions (e.g., regions to be patterned by defining circuit blocks, such as described below regarding S220). The circuit block regions preferably define a regular array (e.g., corresponding to exposure fields of a stepper).

However, in some examples, the PIC structure may include some patterning in one or more circuit block regions (e.g., such that the circuit block regions defined by the PIC structure may differ from one another in some manner). For example, the PIC structure may define one or more voids in a circuit block region, such that corresponding elements of the circuit block that would have been defined at those voids will not be present in the circuit block. In a specific example, the PIC structure may define a void that prevents a transition waveguide from being patterned (e.g., in a situation in which the PIC structure does not include a connecting waveguide to optically couple to the omitted transition waveguide).

Figure 5A:
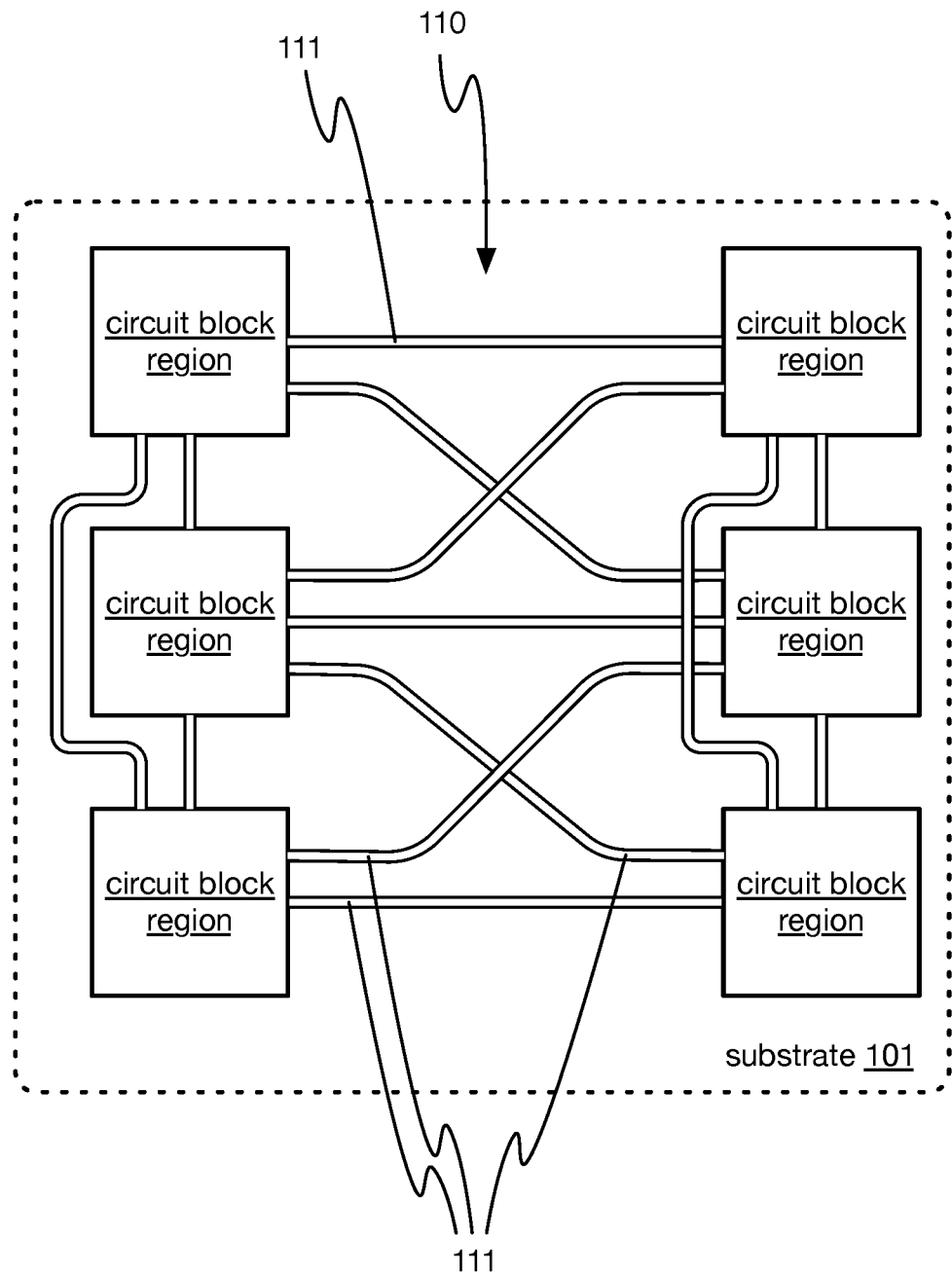
FIG. 5A is a schematic representation of an example of a photonic integrated circuit structure defined according to a first element of the method of fabrication.
Figure 5B:
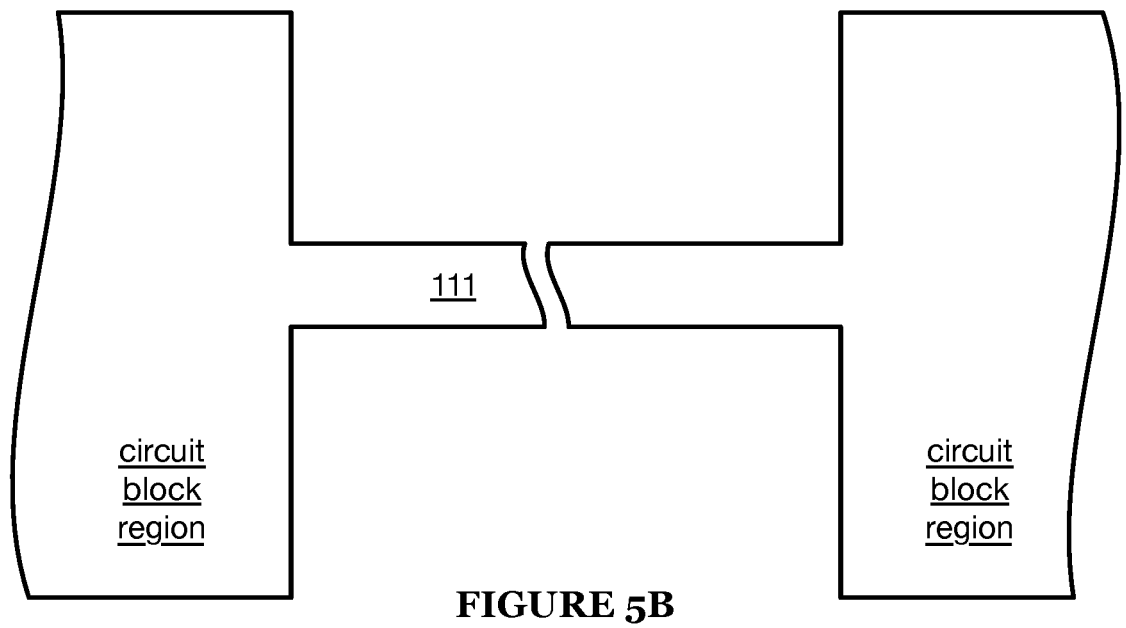
FIG. 5B is a schematic representation of an example of a connecting waveguide connected between portions of two circuit block regions defined according to the first element of the method.
Figure 5C:
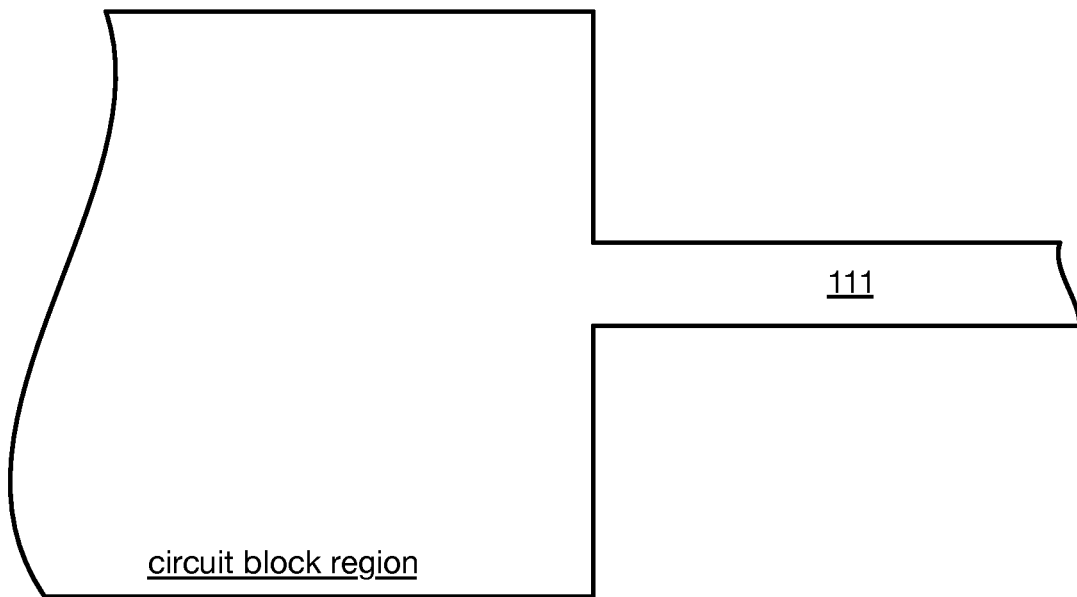
FIG. 5C is a schematic representation of an example of an intersection between a connecting waveguide and a portion of a circuit block region defined according to the first element of the method.

In addition, the PIC structure preferably includes one or more photonic connections (e.g., the connecting waveguides in described above). These photonic connections (e.g., waveguides) preferably terminate at the circuit block regions. For example, the PIC structure can include one or more waveguides (e.g., multi-mode waveguides) connecting between various rectangular circuit block regions (e.g., as shown by way of examples in FIGS. 5A-5C).

The PIC structure can additionally or alternatively include any other suitable photonic and/or electronic devices, electrical traces, and/or any other suitable elements in any suitable arrangement.

Defining the PIC structure S210 is preferably performed before defining circuit blocks S220, but can additionally or alternatively be performed after defining circuit blocks S220, concurrent with defining circuit blocks S220, in alternation with defining circuit blocks S220 (e.g., wherein some circuit blocks are defined before the PIC structure, and other circuit blocks are defined after; wherein a first portion of the PIC structure is defined before the circuit blocks, and a second portions, such as the remainder, of the PIC structure is defined after; wherein multiple alternations between PIC definition and circuit block definition are performed; etc.), in a combination thereof (e.g., concurrent in part and alternating, before, or after in part; etc.), and/or with any other suitable timing.

In alternate examples, S210 can include patterning one or more resist layers (e.g., photoresist) before S220 is performed, but not etching the pattern into the substrate until later, such as after S220 is performed or concurrent with an etching portion of S220. For example, the same photoresist layer can be exposed in both S210 and S220, and the resulting (double-exposed) resist can be used to pattern the underlying substrate.

However, S210 can additionally or alternatively include defining any suitable PIC structure in any other suitable manner.

3.2 Defining Circuit Blocks.

Defining circuit blocks S220 preferably functions to define repeating (e.g., arrayed) and/or small-scale (e.g., approximately inch-scale) circuit blocks. The circuit blocks preferably include higher resolution (e.g., finer than 1 µm resolution) features, but can additionally or alternatively include any suitable feature sizes. The circuit block is preferably on the scale of inches or smaller, such as being contained within a stepper exposure field (e.g., 26×33 mm or 16.5×26 mm exposure field).

The circuit blocks are preferably defined by etching a pattern into the circuit block regions defined in S210 (e.g., etching an identical pattern into each of the circuit block regions). This can be achieved using one or more patterning processes, such as: stepper photolithography (e.g., operating in a stepping or stepping/scanning mode), electron beam lithography, holographic lithography, and/or any other suitable patterning processes. However, the PIC structure can additionally or alternatively be defined by removing material from the substrate in any other suitable manner to define a pattern, by depositing material onto the substrate in a pattern, and/or by patterning material in any other suitable manner.

The patterning process used to define the circuit blocks in S220 is preferably different from the process used to define the PIC structure in S210; however, in alternate embodiments, the same patterning process can be used for both defining the PIC structure and defining the circuit blocks. The patterning process can optionally use a hardmask (e.g., one or more non-organic etch mask layers, to be patterned based on the organic resist patterning and then to act as a mask for subsequent patterning of the substrate material(s)).

In some examples, S220 can include performing one or more preparatory elements to prepare the already-patterned substrate for further patterning (e.g., as shown in FIG. 2B). For example, before beginning the typical patterning process (e.g., photolithographic process), S220 can include depositing a planarization material (e.g., spin-on glass) that can provide a smooth surface (e.g., facilitating even deposition of a resist layer), preferably which can be removed (e.g., using a wet etch, such as an HF etch to remove glass) after the patterning of S220 is performed, while preserving or substantially preserving the patterning achieved in S210 and S220.

S220 preferably includes defining transition features (e.g., the transition features 121a described above). This can include defining a taper from the width of the connecting waveguide down to the width of the transition waveguide. The transition feature is preferably defined in the photonic connection region (and optionally extending into the circuit block region as well).

In some embodiments, registration errors (e.g., between the patterning process used in S210 and the patterning process used in S220) can cause misalignment between the circuit block pattern (e.g., including the transition feature) and the photonic connection. For example, the registration errors can cause misalignments on the order of tens of nanometers (e.g., less than 30-50 nm).

Figure 6A:
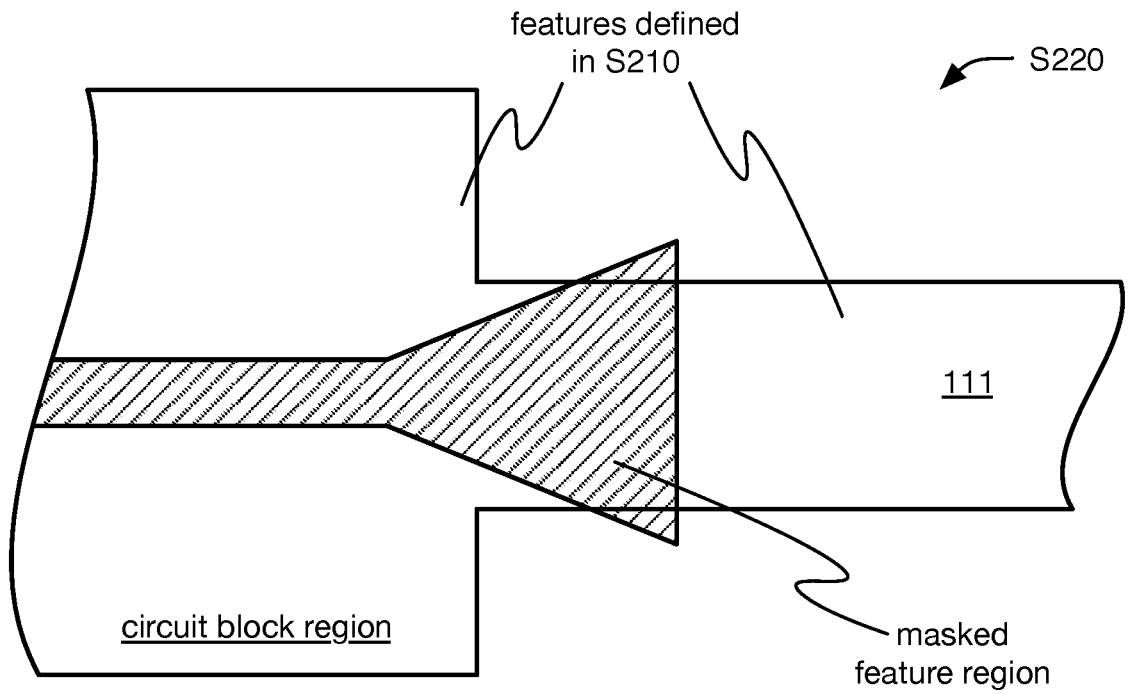
FIGS. 6A-6B are detail views of a schematic representation of a first and second example, respectively, of a second element of the method of fabrication.
Figure 6B:
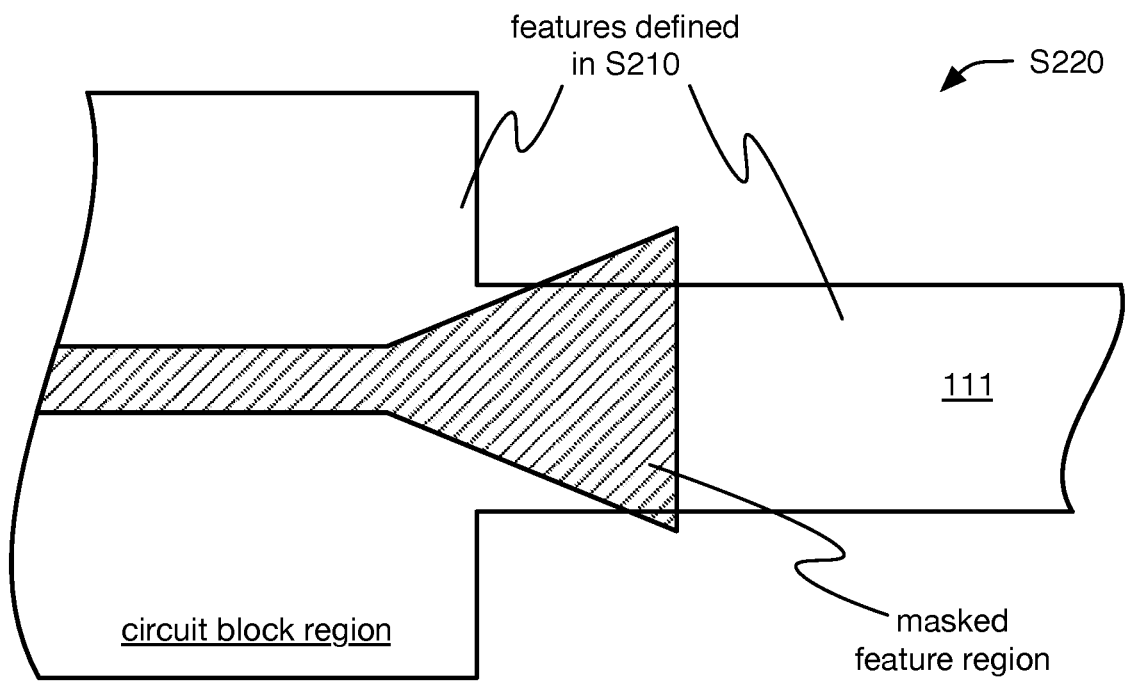

In some examples, S220 can include compensating for this misalignment by using a masked feature region corresponding to the transition feature (e.g., a lithographic mask portion corresponding to the transition feature) that extends past the width of the connecting waveguide (e.g., as shown in FIGS. 6A-6B). Accordingly, if S220 were performed on an unpatterned substrate (rather than on a substrate previously patterning with the PIC structure in S210), the masked feature region would generate a transition feature that reaches a width greater than the connecting waveguide width (however, in this case, the connecting waveguide would not be present, as it is patterned in S210, and so the transition feature would terminate, rather than transitioning into the connecting waveguide).

For example, when performing S220 using a positive photoresist, the mask can prevent exposure of a portion of the photoresist that extends beyond the width of the waveguide. These portions preferably extend past the waveguide in each direction by an amount greater than the registration error tolerance (e.g., the expected error, such as a 3σ error or greater). In a specific example, in which the 1σ error is approximately 10 nm, this can correspond to an extension of 30 nm or more. In some such examples, this transition feature overextension can enable efficient optical coupling between the transition waveguide and the connecting waveguide, even if the two are misaligned (e.g., as shown in FIG. 6B).

In these examples, the portions of the transition feature that extend beyond the width of the waveguide are preferably not present in the resulting PIC once fabrication is complete (e.g., after defining the circuit blocks S220). For example, the material to be patterned in S220 will typically not be present in that extension region (e.g., as it has already been removed in S210), so this extending portion is not present in the resulting structure. This can enable a smooth transition from the connecting waveguide to the transition feature, despite the potential misalignments (e.g., as shown in FIGS. 3 and/or 4A-4C).

In a first specific example, the circuit block pattern is well-aligned with the PIC structure (e.g., the masked feature region for the transition waveguide is substantially collinear with the connecting waveguide), such as shown in FIG. 6A. In this specific example, defining circuit blocks S220 as depicted in FIG. 6A can result in a structure such as shown in FIG. 4A, in which the transition waveguide is substantially collinear with the connecting waveguide.

In a second specific example, the circuit block pattern is misaligned with the PIC structure to some degree (e.g., the masked feature region for the transition waveguide is not substantially collinear with the connecting waveguide, such as being displaced laterally and/or rotationally), and this misalignment is within the expected registration error tolerance (and so the masked feature region for the transition feature extends past the width of the connecting waveguide in both directions), such as shown in FIG. 6B. In this specific example, defining circuit blocks S220 as depicted in FIG. 6B can result in a structure such as shown in FIG. 4B, in which the transition waveguide is not substantially collinear with the connecting waveguide, but an efficient optical coupling between the two is still achieved despite this misalignment.

However, any suitable transition features can additionally or alternatively be defined in any other suitable manner. Further, S220 can additionally or alternatively include defining any suitable circuit blocks in any other suitable manner.

The method can additionally or alternatively include fabricating any other suitable structures and/or can include any other suitable fabrication processes.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for photonic integrated circuit (PIC) fabrication, comprising:
   using a first lithographic patterning technique, lithographically defining a PIC structure on a substrate, the substrate comprising a first layer, the PIC structure comprising:
      a plurality of circuit block regions; and
      a set of connecting waveguides, each connecting waveguide of the set connected between circuit block regions of the plurality, wherein each circuit block region of the plurality is contiguous with a respective connection region of a respective connecting waveguide of the set; and
   for each circuit block region of the plurality:
      using a second lithographic patterning technique different from the first lithographic patterning technique, lithographically defining a photonic circuit block within the circuit block region, the photonic circuit block comprising:
         a transition waveguide optically coupled to the respective connecting waveguide at the respective connection region, wherein the transition waveguide defines a first width and the respective connecting waveguide optically coupled to the transition waveguide defines a second width substantially greater than the first width; and
         a plurality of photonic circuit elements, wherein at least one photonic circuit element of the plurality is optically coupled to the transition waveguide; and
      using the second lithographic patterning technique, substantially concurrent with lithographically defining the photonic circuit block, lithographically defining a transition feature that optically couples the transition waveguide to the respective connecting waveguide;
   wherein, for each circuit block region of the plurality, before lithographically defining the photonic circuit block within the circuit block region:
      the respective connection region contiguous with the circuit block region defines a third width; and
      the circuit block region defines a fourth width substantially greater than the third width;
   wherein, for each circuit block region of the plurality:
      the transition feature defines a transition waveguide end contiguous with the transition waveguide;
      the transition feature defines a connecting waveguide end contiguous with the connecting waveguide;
      the transition feature tapers from the second width, proximal the connecting waveguide end, to the first width, proximal the transition waveguide end;
      the respective connecting waveguide is lithographically defined in the first layer, wherein lithographically defining the respective connecting waveguide comprises:
         protecting a first set of lateral regions of the substrate from etching, the first set of lateral regions comprising a first lateral region and a second lateral region, wherein the first and second lateral regions are contiguous; and
         while protecting the first set of lateral regions, etching the first layer within a third lateral region of the substrate, wherein the second and third lateral regions are contiguous; and
      the transition feature is lithographically defined in the first layer, wherein lithographically defining the transition feature comprises, after lithographically defining the respective connecting waveguide:
         protecting a second set of lateral regions of the substrate from etching, the second set of lateral regions comprising the second and third lateral regions, wherein the first and second sets of lateral regions overlap throughout the second lateral region and do not overlap at the first or third lateral regions; and
         while protecting the second set of lateral regions, etching the first layer within the first lateral region.

2. The method of claim 1, wherein, for each circuit block region of the plurality, the second lithographic patterning technique is not capable of patterning a transition feature wider than the second width at the connecting waveguide end, wherein the width of the transition feature is limited to the second width by the PIC structure.

3. The method of claim 2, wherein, for each circuit block region of the plurality:
lithographically defining the transition feature comprises using a lithographic mask comprising a transition feature mask portion that defines the transition feature; and
the transition mask feature portion is configured such that, in a situation in which the second lithographic patterning technique is used with the lithographic mask on an unpatterned substrate, the transition feature mask portion would define a feature having a maximum width greater than the second width.

4. The method of claim 1, wherein, for each circuit block region of the plurality, before lithographically defining the photonic circuit block within the circuit block region, the circuit block region is substantially uniform.

5. The method of claim 1, wherein each photonic circuit block is substantially identical.

6. The method of claim 1, wherein the second lithographic patterning technique is a stepper photolithography technique.

7. The method of claim 6, wherein the stepper photolithography technique defines an exposure field size, wherein, for each circuit block region of the plurality, the photonic circuit block is contained within the exposure field size.

8. The method of claim 7, wherein at least one connecting waveguide of the set exceeds the exposure field size.

9. The method of claim 6, wherein the first lithographic patterning technique is a contact photolithography technique.

10. The method of claim 6, wherein the first lithographic patterning technique is a nanoimprint lithography technique.

11. The method of claim 1, wherein:
the PIC structure is defined within a layer of the substrate; and
for each circuit block region of the plurality, the photonic circuit block is defined within the layer.

12. The method of claim 11, wherein the substrate is a silicon-on-insulator substrate, wherein the layer is a silicon layer.

13. The method of claim 1, wherein the PIC structure is defined on a wafer, the wafer defining a diameter, wherein a characteristic lengthscale of the PIC structure is at least 60% of the diameter.

14. The method of claim 1, wherein, for a first circuit block region of the plurality:
a first circuit block region of the plurality is contiguous with a second connection region of a second connecting waveguide of the PIC structure, wherein the set of connecting waveguides does not comprise the second connecting waveguide; and
for the first circuit block region, the photonic circuit block further comprises a second transition waveguide optically coupled to the second connecting waveguide at the second connection region.

15. The method of claim 14, wherein the second connecting waveguide is optically coupled to an edge device arranged proximal an edge of the substrate.

16. The method of claim 15, wherein the edge device comprises a fiber transposer optically coupled to an optical fiber.

17. The method of claim 16, wherein the fiber transposer optically couples the second connecting waveguide to the optical fiber.

18. The method of claim 1, wherein:
each connecting waveguide a multi-mode waveguide; and
each transition waveguide is a single-mode waveguide.

* * * * *